(12) United States Patent
Opsasnick

(10) Patent No.: US 7,953,002 B2
(45) Date of Patent: May 31, 2011

(54) BUFFER MANAGEMENT AND FLOW CONTROL MECHANISM INCLUDING PACKET-BASED DYNAMIC THRESHOLDING

(75) Inventor: Eugene Opsasnick, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 422 days.

(21) Appl. No.: 11/595,978

(22) Filed: Nov. 13, 2006

(65) Prior Publication Data

US 2007/0104102 A1    May 10, 2007

Related U.S. Application Data

(60) Provisional application No. 60/735,180, filed on Nov. 10, 2005, provisional application No. 60/772,884, filed on Feb. 14, 2006.

(51) Int. Cl.
*H04L 12/26* (2006.01)
*H04L 1/00* (2006.01)
*H04L 12/28* (2006.01)
*G06F 15/173* (2006.01)

(52) U.S. Cl. ......... 370/230; 370/235; 370/389; 709/225

(58) Field of Classification Search .................. None
See application file for complete search history.

(56) References Cited

U.S. PATENT DOCUMENTS

| | | | | |
|---|---|---|---|---|
| 5,748,629 A * | 5/1998 | Caldara et al. | ................ | 370/389 |
| 5,757,771 A * | 5/1998 | Li et al. | .................... | 370/235 |
| 5,850,399 A * | 12/1998 | Ganmukhi et al. | ........... | 370/412 |
| 6,259,698 B1 * | 7/2001 | Shin et al. | ................... | 370/395.7 |
| 6,424,624 B1 * | 7/2002 | Galand et al. | ................. | 370/231 |
| 6,452,901 B1 * | 9/2002 | Yang et al. | ..................... | 370/231 |
| 6,519,226 B1 | 2/2003 | Kumar | | |
| 6,621,825 B1 | 9/2003 | Walsh | | |
| 6,650,645 B2 * | 11/2003 | Scott et al. | ................ | 370/395.71 |
| 6,934,289 B2 * | 8/2005 | Lee | ............................ | 370/395.1 |
| 7,075,927 B2 * | 7/2006 | Mo et al. | ........................ | 370/389 |
| 7,245,586 B2 | 7/2007 | Bitar | | |
| 7,502,366 B1 * | 3/2009 | Erimli et al. | ................... | 370/389 |
| 2001/0038607 A1 * | 11/2001 | Honda | .......................... | 370/218 |
| 2004/0042477 A1 * | 3/2004 | Bitar et al. | .................... | 370/412 |
| 2007/0104102 A1 | 5/2007 | Opsasnick | | |
| 2007/0104195 A1 | 5/2007 | Tatapudi | | |

OTHER PUBLICATIONS

Non-Final Rejection regarding U.S. Appl. No. 11/583,155 mailed Jun. 8, 2009.
Amendment/Req. Reconsideration—After Non-Final Rejecttion regarding U.S. Appl. No. 11/583,155 mailed Oct. 8, 2009.
Final Rejection regarding U.S. Appl. No. 11/583,155 mailed Feb. 8, 2010.
Amendment/Req. Reconsideration—After Final Rejection regarding U.S. Appl. No. 11/583,155 mailed Jul. 7, 2010.
Notice of Allowance regarding U.S. Appl. No. 11/583,155 mailed Nov. 16, 2010.

* cited by examiner

*Primary Examiner* — Daniel J Ryman
*Assistant Examiner* — Cassandra Decker

(57) ABSTRACT

A network device for processing data includes at least one ingress module for performing switching functions on incoming data, a memory management unit for storing the incoming data and at least one egress module for transmitting the incoming data to at least one egress port. The at least one ingress module is configured to determine a priority for the incoming data, where that priority is mapped to a discrete number of priority groups and where the priority groups are determined on a per-port basis and provide guaranteed delivery or best throughput, and flow of data through the network device is controlled on a basis of at least one of the priority groups and assigned priorities.

13 Claims, 9 Drawing Sheets

BUFFER MANAGEMENT AND FLOW CONTROL MECHANISM INCLUDING PACKET-BASED DYNAMIC THRESHOLDING

CROSS-REFERENCE TO RELATED APPLICATIONS

This application claims priority of U.S. Provisional Patent Applications Ser. No. 60/735,180, filed on Nov. 10, 2005 and 60/772,884, filed on Feb. 14, 2006. The subject matter of this earlier filed application is hereby incorporated by reference.

BACKGROUND OF THE INVENTION

1. Field of the Invention

The invention relates to a method and apparatus for high performance switching in local area communications networks. In particular, the invention relates to a buffer management and flow control mechanism that utilizes priority groups in the handling of packets in the network device, so that flows of data and types of data can be managed in ways that allow for all resources to be efficiently utilized.

2. Description of the Related Art

A switching system may include one or more network devices, such as an Ethernet switching chip, each of which includes several modules that are used to process information that is transmitted through the device. Specifically, the device may include at least one ingress module, a Memory Management Unit (MMU) and at least one egress module. The ingress module may include switching functionality for determining to which destination port a packet should be directed. The MMU is used for storing packet information and performing resource checks. The egress module may be used for performing packet modification and for transmitting the packet to at least one appropriate destination port. One of the ports on the device may be a CPU port that enables the device to send and receive information to and from external switching/routing control entities or CPUs. Some devices also include a CPU processing module through which the device interfaces with external CPU ports.

In the processing of datagrams, such as packets, certain packets may receive preferential treatment when compared to other packets. As such, certain packets may be assigned a higher Quality of Service (QoS), such that those packets are given preferred treatment. This preferred treatment may be given, for example, to packets where time sensitive receipt of those packets is important. In many prior art systems, many QoS states are assigned, so that varying degrees of handling and prioritization can be provided. However, even if a small amount of bandwidth is allocated to a particular QoS state and is not used, that bandwidth is "wasted," in that it could be utilized by other resources. Thus, there is a need in the prior art for systems that allow for dynamic management of buffers and thresholds to allow for efficient utilization of all resources of a network device.

BRIEF DESCRIPTION OF THE DRAWINGS

For the present invention to be easily understood and readily practiced, various embodiments will now be described, for purposes of illustration and not limitation, in conjunction with the following figures.

DETAILED DESCRIPTION OF THE PREFERRED EMBODIMENTS

The present invention is directed to many embodiments that provide many useful features with respect to buffer management and thresholding. These features are briefly discussed below and in greater detail in the sections that follow. These features include the grouping of Quality of Service Priorities into Priority Groups (PGs) and guarantees of minimum bandwidth for each Priority Group, and each port. The buffer management and flow control mechanism also includes dynamic sharing of buffer space on a per-port and per-priority group basis, per-priority group and per-priority flow control and guarantees buffer space allocation (per-priority group headroom) on a per-input port/PG basis to guarantee lossless behavior. A "xon-floor" threshold is employed to guarantee xon messages do not wait too long before going out so that the port does not become starved for data before the data transmission resumes. A reserved "global headroom" buffer space is used on a first-come, first served basis to allow non-lossless traffic to complete a partially received packet. This allows for the network device to behave in a fairer manner for large and small packet sizes. User-controllable modes allow the user to select the intra-packet discard policy when a threshold is reached and a new mechanism to guarantee a minimum buffer allocation on a per-output port/queue basis which still makes maximum use of the buffer for multicast packets.

Figure 1:
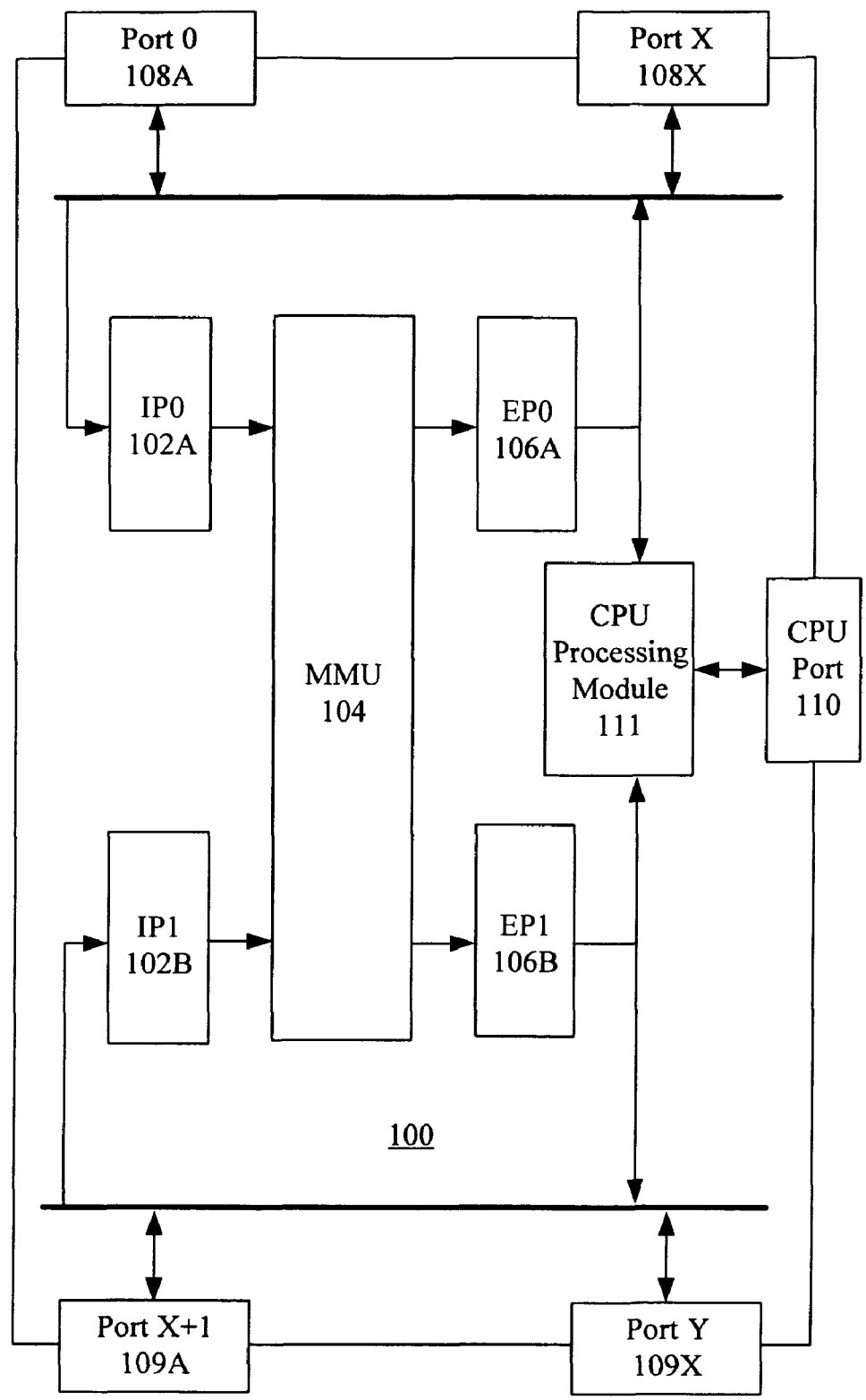
FIG. 1 is an illustration of a network device in which an embodiment of the present invention may be implemented.

FIG. 1 illustrates a network device, such as a switching chip, in which an embodiment the present invention may be implemented. Device 100 includes ingress modules 102A and 102B, a MMU 104, and egress modules 106A and 106B. Ingress modules 102A and 102B are used for performing switching functionality on an incoming packet. MMU 104 is used for storing packets and performing resource checks on each packet. Egress modules 106A and 106B are used for performing packet modification and transmitting the packet to an appropriate destination port. Each of Ingress modules 102A, 102B, MMU 104 and Egress modules 106A and 106B include multiple cycles for processing instructions generated by that module. Device 100 implements a dual-pipelined approach to process incoming packets. One aspect which effects the performance of device 100 is the ability of the pipelines to process one packet every clock cycle. It is noted that the embodiment illustrated in FIG. 1 shows dual-pipelines, the present invention may also be applicable to systems that use a single pipeline or more than two pipelines.

Device 100 can also include a number of ports to send and receive data, such as Port 0 to PortX, 108A-108X, and Port X+1 to PortY, 109A-109X. The ports can be separated and are serviced by different ingress and egress port modules to support the dual-pipeline structure. One or more internal fabric high speed ports, for example a highspeed port, or more external Ethernet ports may be configured from the above-discussed ports. The network device can also include a CPU port 110 and a CPU processing module 11 to communicate with an external CPU. High speed ports are used to interconnect various network devices in a system and thus form an internal switching fabric for transporting packets between external source ports and one or more external destination ports. As such, high speed ports are not externally visible outside of a system that includes multiple interconnected network devices. CPU port 110 can be used to send and receive packets to and from external switching/routing control entities or CPUs. Device 100 interfaces with external/off-chip CPUs through a CPU processing module 111, which interfaces with a PCI bus that connects device 100 to an external CPU.

Network traffic also enters and exits device 100 through external ports 108A-108X and 109A-109X. Specifically, traffic in device 100 is routed from an external source port to one or more unique destination ports. In one embodiment of the invention, device 100 supports physical Ethernet ports and logical (trunk) ports. A physical Ethernet port is a physical port on device 100 that is globally identified by a global port identifier. In an embodiment, the global port identifier includes a module identifier and a local port number that uniquely identifies device 100 and a specific physical port. The trunk ports are a set of physical external Ethernet ports that act as a single link layer port. Each trunk port is assigned a global trunk group identifier (TGID). According to an embodiment, device 100 can support up to 128 trunk ports, with up to 8 members per trunk port, and up to 29 external physical ports.

Once a packet enters device 100 on a source port 109A-109X or 108A-108X, the packet is transmitted to one of the ingress modules 102A or 102B for processing. Packets may enter device 100 from a XBOD or a GBOD. The XBOD is a block that has one 10GE/12G MAC and supports packets from high speed ports and the GBOD is a block that has 12 10/100/1G MAC and supports packets from other ports.

The architecture of the network device provides for the ability to process data received quickly and also allows for a flexibility of processing. A part of this flexibility comes from the pipeline structure that is used to process packets once they are received. Data from the packet and attributes of that packet move through the modules of the network device, discussed above, in a pipeline structure. Each stage in the pipeline structure requires a set number of clock cycles and the packets are processed in order. Therefore, the packet is parsed, table lookups are performed, a decision routing process is performed and the packet is modified, before being sent out on an egress port. Each stage in the pipeline performs its function so that the overall function of the network device is achieved.

Figure 2:
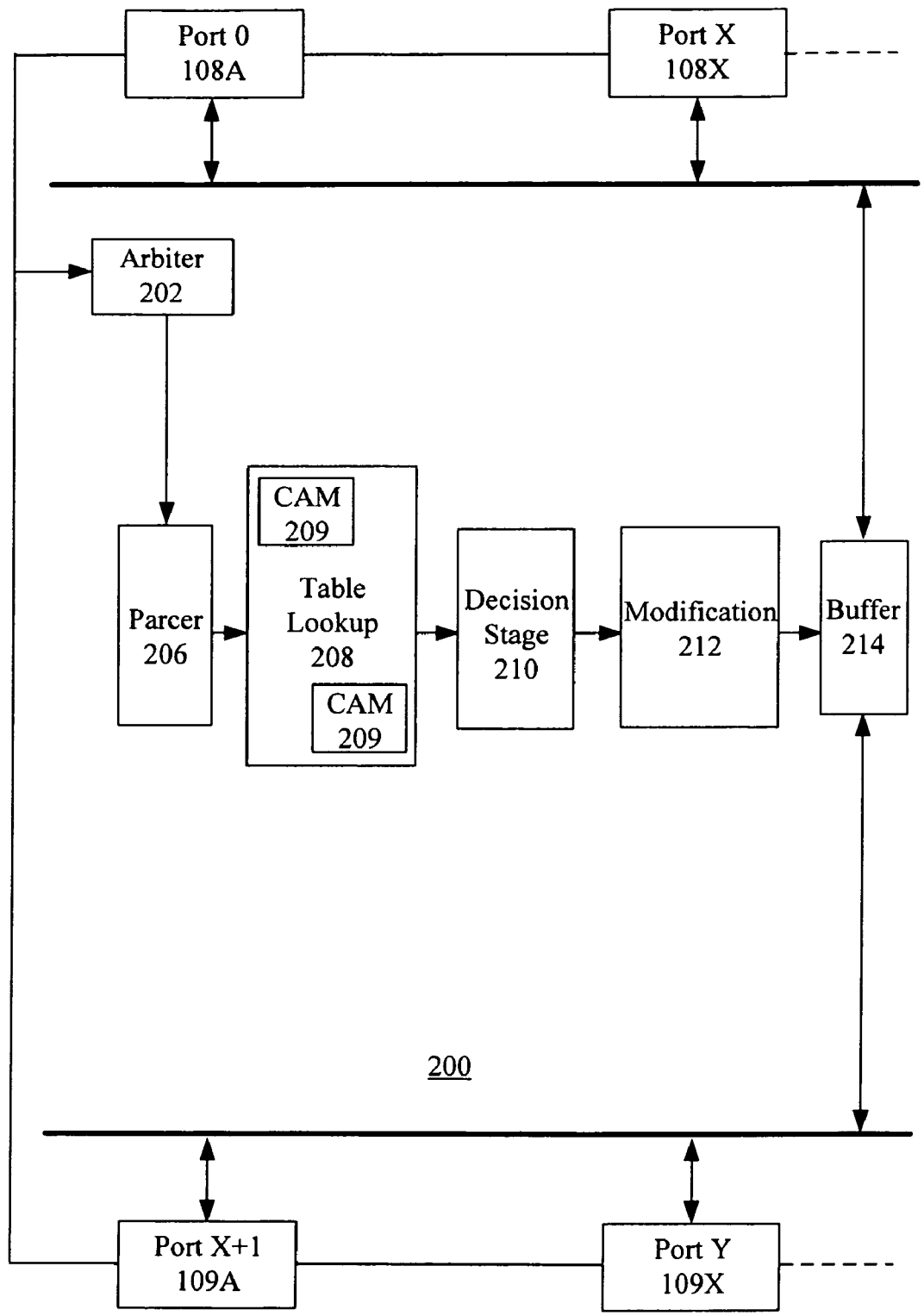
FIG. 2 illustrates a centralized egress pipeline architecture of an ingress stage in an exemplary embodiment of the present invention.

FIG. 2 illustrates a centralized egress pipeline architecture 200 of egress stages 106A and 106B, i.e. one side of the dual-pipeline. The egress pipeline can include an arbiter 202, a parser 206, a table lookup stage 208, multiple content-addressable memories (CAMs) 209, a decision stage 210, a modification stage 212 and a data buffer 214. Arbiter 202 provides arbitration for accessing egress pipeline 200 resources between packet data and control information from MMU and information from the CPU. Parser 206 performs packet parsing for table lookups and modifications. Table lookup stage 208 performs table lookups for information transmitted from parser 206, through use of the CAMs 209. The decision stage 210 is used for deciding whether to modify, drop or otherwise process the packet. The modification stage 212 makes modifications to the packet data based on outputs from previous stages of the ingress module.

Arbiter 202 collects packet data and control information from MMU 104 and read/write requests to registers and memories from the CPU and synchronizes the packet data and control information from MMU 104 and writes the requests from the CPU in a holding register. Based on the request type from the CPU, arbiter 202 generates pipeline register and memory access instructions and hardware table initialization instructions. After arbiter 202 collects packet data, CPU requests and hardware table initialization messages, it generates an appropriate instruction. According to an embodiment, arbiter 202 generates a Start Cell Packet instruction, an End Cell of Packet instruction, a Middle Cell of Packet instruction, a Start-End Cell of Packet instruction, a Register Read Operation instruction, a Register Write Operation instruction, a Memory Read Operation instruction, a Memory Write Operation instruction, a Memory Reset Write Operation instruction, a Memory Reset Write All Operation instruction and a No Operation instruction. Egress pipeline resources associated Start Cell Packet instructions and Start-End Cell of Packet instructions are given the highest priority by arbiter 204. End Cell of Packet instructions, Middle Cell of Packet instructions, Register Read Operation instructions, Register Write Operation instructions, Memory Read Operation instructions and Memory Write Operation instruction receive the second highest priority from arbiter 204. Memory Reset Write Operation instructions and Memory Reset Write All Operation instructions receive the third highest priority from arbiter 204. No Operation instructions receive the lowest priority from arbiter 204.

After receiving an instruction from arbiter 204, the parser 206 parses packet data associated with the Start Cell of Packet instruction and the Start-End Cell of Packet instruction using the control information and a configuration register transmitted from arbiter 206. According to an embodiment, the packet data is parsed to obtained L4 and L3 fields which appear in the first 148 bytes of the packet. Table lookup stage 208 then receives all packet fields and register values from parser 206.

Figure 3:
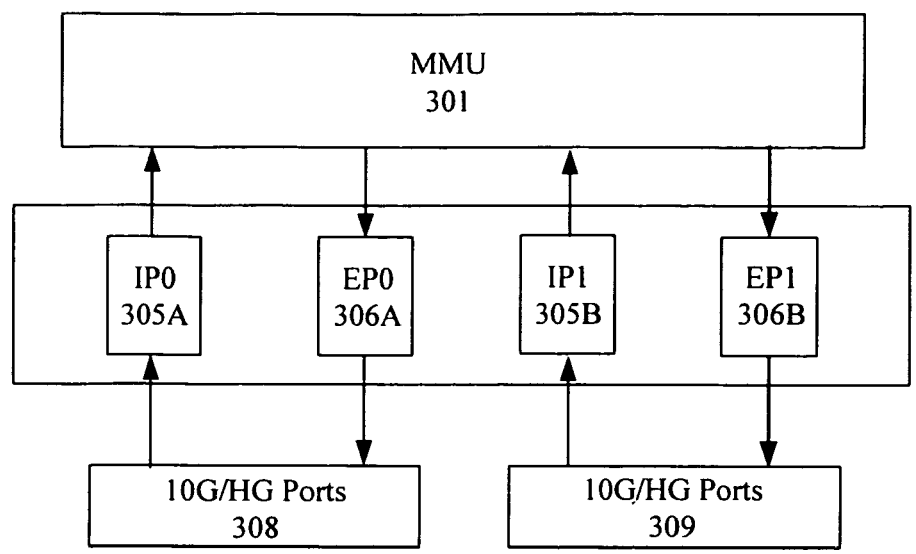
FIG. 3 illustrates multiple pipelines for controlling flows of data from the ports to and from the MMU in an exemplary embodiment of the present invention.
Figure 4:
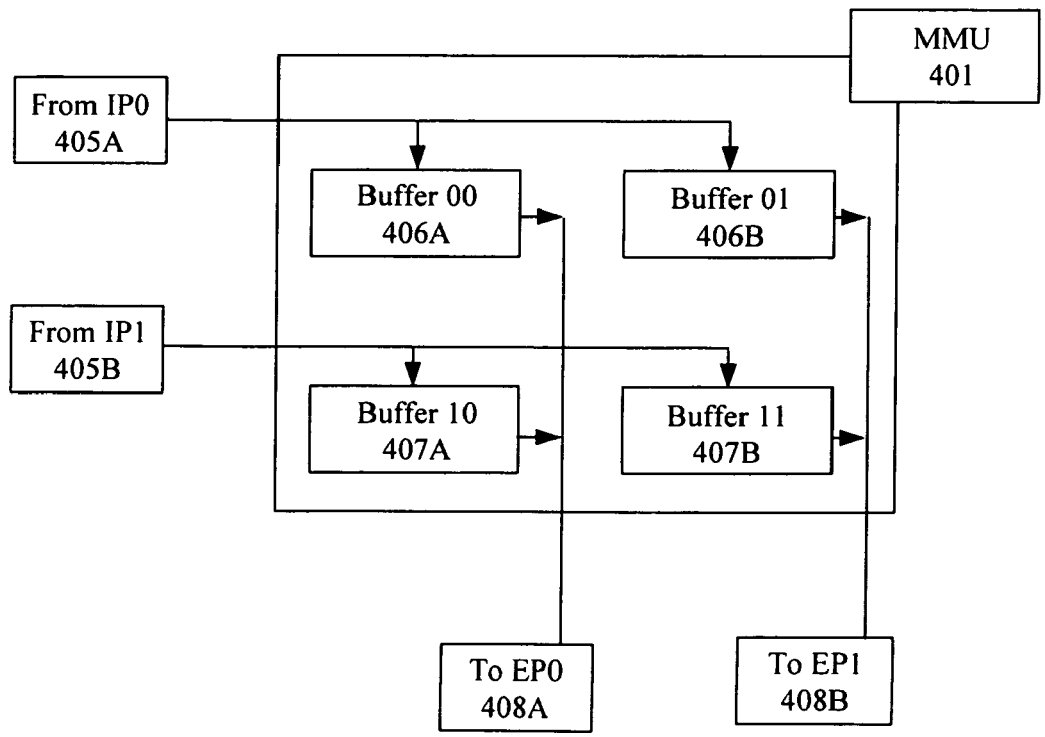
FIG. 4 illustrates an MMU data path in an exemplary embodiment of the present invention.

As discussed above, the network device can, according to certain embodiments, use two sets of IP/EP pipelines to support 20 ports of 10GE (or 16 ports of 12G highspeed) as shown in FIG. 3. Thus, in the illustrated embodiment, ports 0-9 308 are served by IP0 305A and EP0 306A, and ports 10-19 309 are served by IP1 305B and EP1 306B. Both sets of modules communicate with a single MMU 301. To support 20 ports of 10GE, the MMU 401 is split into 4 crosspoint buffers, as illustrated in FIG. 4. Thus, data coming from IP0 405A is received by buffers 00 and 01 (406A & 406B) before being sent to EP0 and EP1 (408A & 408B), with buffers 10 and 11 (707A & 407B) receiving data from IP1 405B. It should be noted that the multiple buffers can be reduced to a single shared buffer by speeding up the memory. Each buffer handles 10 input ports and 10 output ports, making the bandwidth requirement for each memory unit 100 Gbps, bi-directional, according to certain embodiments.

The Admission control, including thresholds, and enqueueing occur at each cross-point buffer and are independent of the other crosspoint buffers. Therefore, separate cell buffer counts and queues are provided at each crosspoint. This means that each output port will own two physical queues for each logical queue implemented. The two physical queues have packets that are of the same class to the same output port, but from different sets of input ports. The output port and queue scheduling should to be done on a unified basis for each port. Each port scheduler should see the physical queues at each of two crosspoint buffers, but only needs a scheduling database (min/max values) on a per logical queue basis. One difference from prior art network devices is the addition of 2 extra queues at each highspeed output port, named the SC and QM queues. The CONTROL opcode can be used to map packets in the SC queue when in a specific mode. Legacy packets that are E2EFC or E2ECC packets (as determined by the DMAC address) will be mapped into the QM queue of the egress highspeed port when in the specific mode.

The MMU uses the XQ queuing structure with 2 k XQ's per port (29 ports), in one embodiment. The XQ's are very different for the GE, HG (i.e. highspeed port), and CPU ports. Much of the header information that is required to format outgoing packets on the HG ports is held in the HG's XQ. This is because the network device may have 4 HG ports with 2 k XQ entries each, or a total of 8 k HG XQ's, and there are 16 k cells. With all ports potentially HG ports, according to one embodiment, much of the data in the HG XQ's is moved the Packet Header table (indexed by cell address). The functional part of the XQ is broken up into two separate memories: pktLink and pktHDR. Most of the packet information is not contained in the pktHDR which is shared by all ports and queues. The pktLink is used to link one packet to the next to form a linked-list queue. The only portion that is not shared between ports is the pktLink table, so that multicast packets can be linked anywhere in the queue for different ports. This allows all CoS queues within a port to share all of the pktLink entries for that port. Also, the pktLink size is changed to be 4 k per port (the same as the number of cells). With a complete set of packet links (4 k) per port, more of the memory can be flexibly used, enabling maximum utilization with the dynamic threshold scheme. This obviates the need for thresholds on a packet basis. All thresholds are only based on cell counters per queue and per port. Also, there is no need for a first_cell pointer in the XQ entry since the address of the pktLink entry is the same as the first_cell address.

Figure 5:
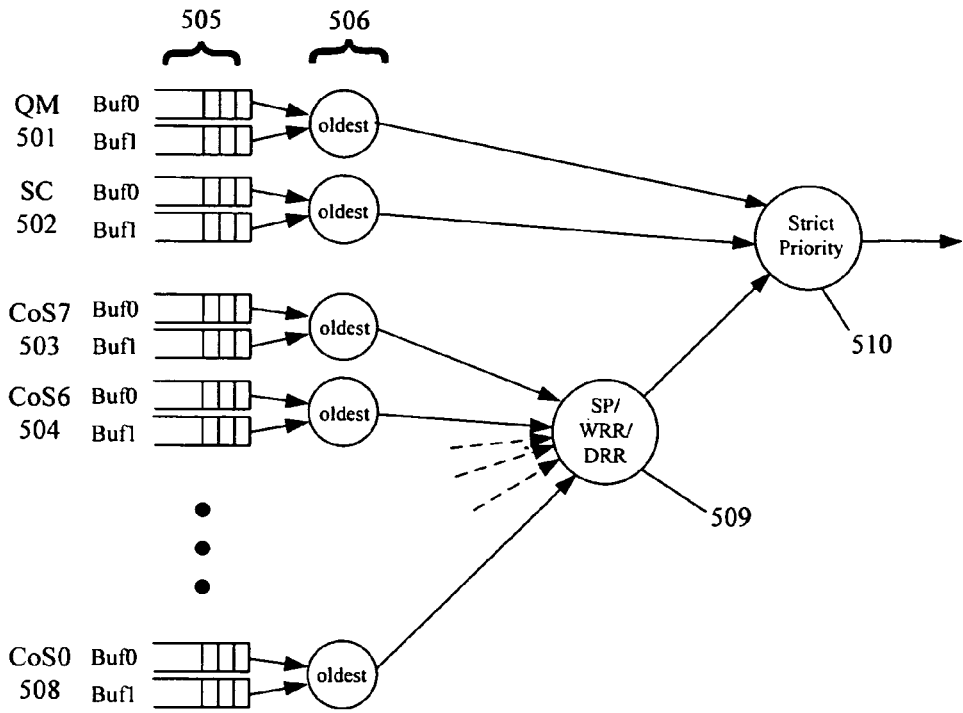
FIG. 5 illustrates the priorities given to different buffers in an exemplary configuration of the present invention.

The scheduling mechanism for each port schedules between the eight best effort queues. This is illustrated in FIG. 5. Features of this include strict priority (SP), weighted round robin (WRR), deficit round robin (DRR), and mixed SP/DRR 509. There is also a minimum rate guarantee and a maximum rate enforcement, and on top of the regular 8 COS queues, 503-508, the SC and QM queues, 501 and 502, are scheduled with strict priority 510. Each port has equivalent sets of queues at each of two crosspoint buffers. In order to fairly schedule between the relative priorities, the MMU first schedules between the logical set of queues, if either physical queue of one class is occupied, the logical class participates in the scheduling round. After a logical queue is selected, one of the two equivalent physical queues is selected if they both have data. This can be done by reading a timestamp on the head of each physical queue 505 and selecting the oldest 506 of the two packets or by doing a simple RR or DRR (with equal weights) between the two equivalent queues. The timestamp method is preferred if the cost is not too high.

Figure 6:
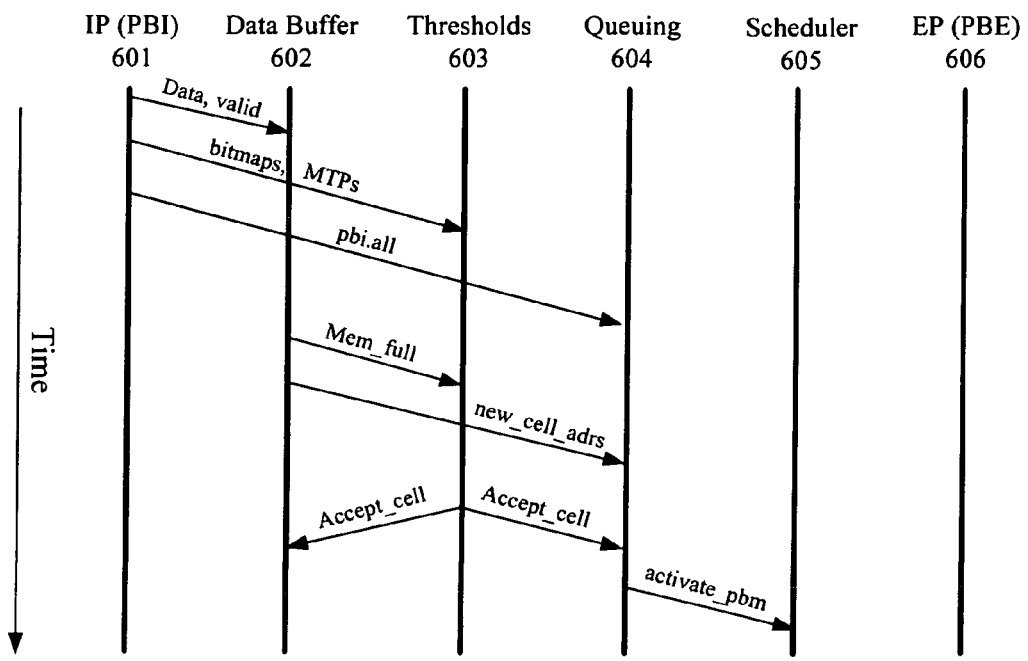
FIG. 6 illustrates steps involved in the ingress packet flow for the MMU in an exemplary embodiment of the present invention.

The ingress control and data flow process is illustrated in FIG. 6. The timeline shows the sequence of events that occur when a cell arrives in the MMU. The following list describes each step in the ingress flow in more detail. A packet arrives from PBI 601, where PBM and COS, go to Threshold block, the Data goes to the buffer block and the Rest of control goes to the Queuing block. The Buffer block 602 allocates a cell and stores data into buffer (CBP), new_cell_adrs is sent to Queuing and buffer_full indication is sent to the Thresholds 603 if no cell is available. The Threshold Block 603 determines if the cell (and whole packet) is accepted or discarded, a cell_accept is sent to Buffer block 602 and Queuing block 604, where if not accepted, cell buffer is recycled. Queuing block gets: PBI information and cell_accept, new_cell_adrs, the Queuing Block adds the cell to input port re-assembly queue, the pktHDR table and the cellHdr table are written to. If this completes a packet (End cell), then Queueing block 604 links the packet to one or more port queues (cut-through can do an early packet link). The Queuing block sends bitmap of newly non-empty ports/queues to Scheduler block 605 for future scheduling. The Thresholds block 603 updates the counters and indicates new flow control state if needed. The Egress Port 605 is discussed below.

Figure 7:
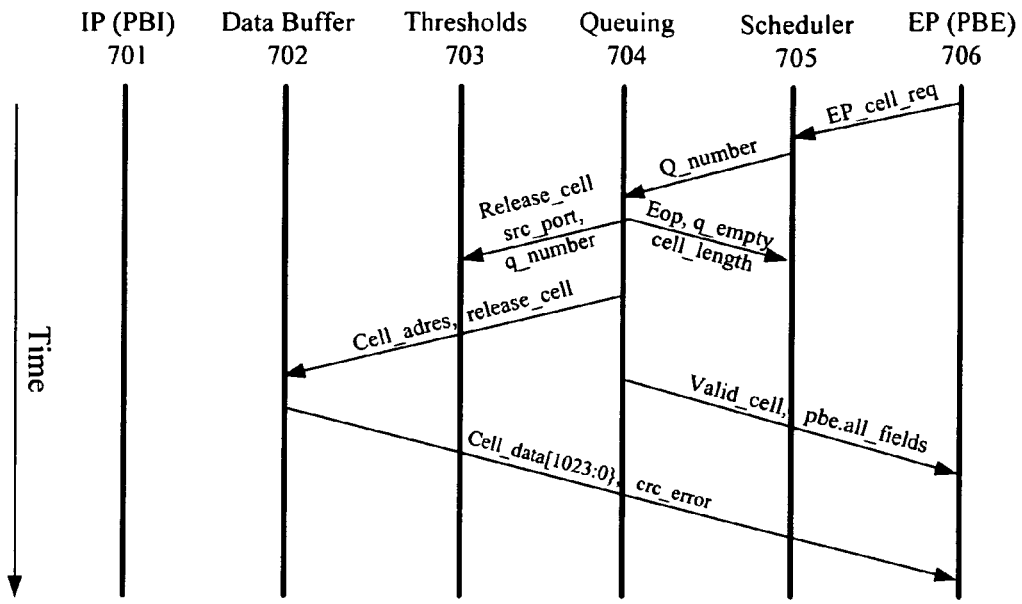
FIG. 7 illustrates steps involved in the egress packet flow for the MMU in an exemplary embodiment of the present invention.

An example of the sequence of events for egress is illustrated in FIG. 7, where data was received previously by the Ingress Port 701. The FIG. 7 timeline shows the sequence of events between the MMU blocks when a cell is scheduled, where a description of the egress flow is provided below. A Cell is requested by the EP 706 for a given port (this should occur before MMU is allowed to schedule a cell) and the Scheduler block 705 selects Port (TDM) and then a queue for that port, and the port/cos value is sent to Queuing block. The Queuing block 704 does the needed lookups for the packet/cell, and responds to Scheduler and the Sends cell_length, EoP, q_empty is sent to the Scheduler 705. The Queuing block sends tx_cell_adrs to buffer block 702 for read and then the Queuing block 704 puts together PBE bus signals and sends PBE to EP in parallel to data from buffer. The Scheduler block sends mux select signals for correct crosspoint. If the last copy of cell has been transmitted, then also the tx_cell_adrs is sent to the Buffer block 702 to be put back into the free cell pool, cell_released, src_port_num, output_port, and q_number are sent to the Thresholds block 703 to decrement port and queue counters and Thresholds block 703 updates the flow control counters and indicates new flow state to flow control generator.

After the output queue thresholds and input port thresholds are calculated for an incoming cell, the admission control block makes a final decision on whether or not to accept the cell into the data buffer. Input for this decision comes from several places that can cause cells to be discarded, including the output-queue thresholds, the input-port thresholds, and the buffer full condition (from CFAP). The top-level admission flow is shown in FIG. 8.

Figure 8:
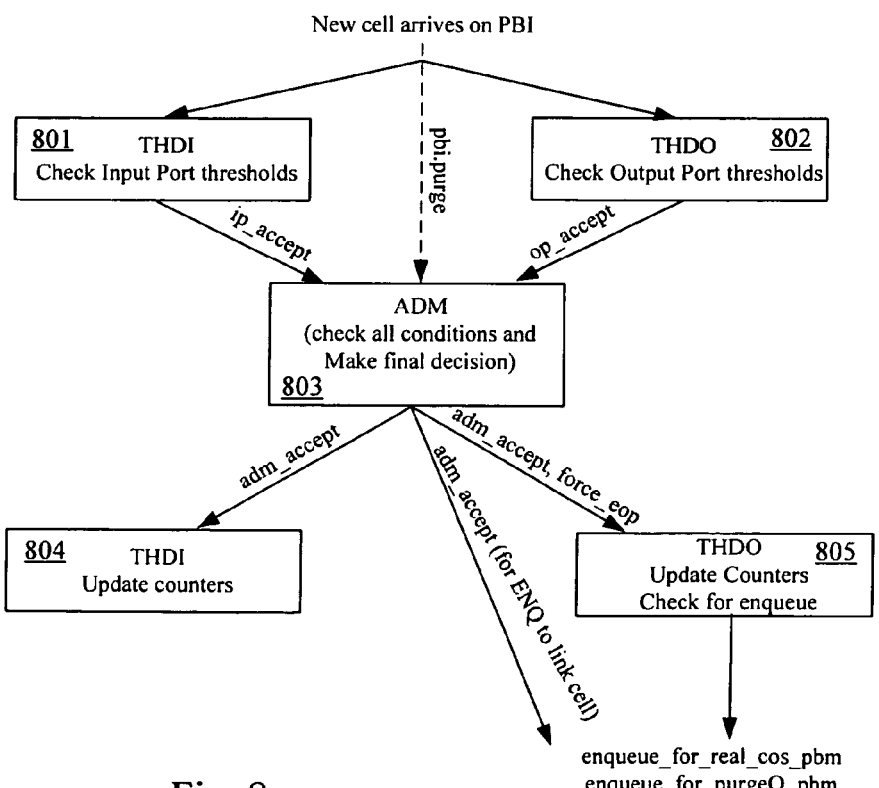
FIG. 8 illustrates an admission flow control process in the MMU in an exemplary embodiment of the present invention.

As illustrated in FIG. 8, a cell arrives from PBI and input-port-based thresholds (THDI, 801) and output-port-based thresholds (THDO, 802) are used to decide if the cells can be accepted. The Admission control block (ADM, 803) takes the THDI and THDO threshold and takes on all other control information into account to make the final cell accept decision. THDI 804 and THDO 805 modules use the final decision to update their own counters and THDO is also used to determine if the packet should be enqueued.

The following inputs are used to make the final accept/discard decision: ip_discard, op_discard, buffer_full, new_cell_adrs_valid, pbi.purge, and ASF_done. ip_discard is used to determine when to drop for input port thresholds and op_discard is used to determine when to drop for output port thresholds. buffer_full is used when no cell is available from CFAP, memory is full, and any incoming cell will be discarded. When asserted, it stays on until the reset value is reached (has hysteresis). This is actually asserted before the CFAP runs out of cell addresses (the hold-back amount). new_cell_adrs_valid is sent from CFAP, this is usually asserted every cycle. The cell address can be valid even if buffer_full is asserted. If there is really no new cell address available or the CFAP has a parity error, then this signal will not be asserted, which means there is no place to write the current cell from the PBI. The incoming cell will be discarded. This signal has no hysteresis. For pbi.purge, the IP has determined that the packet should be purged (from the PBI bus). For ASF_done, the input from the output thresholds that packet is being enqueued early with this cell for ASF.

Figure 9:
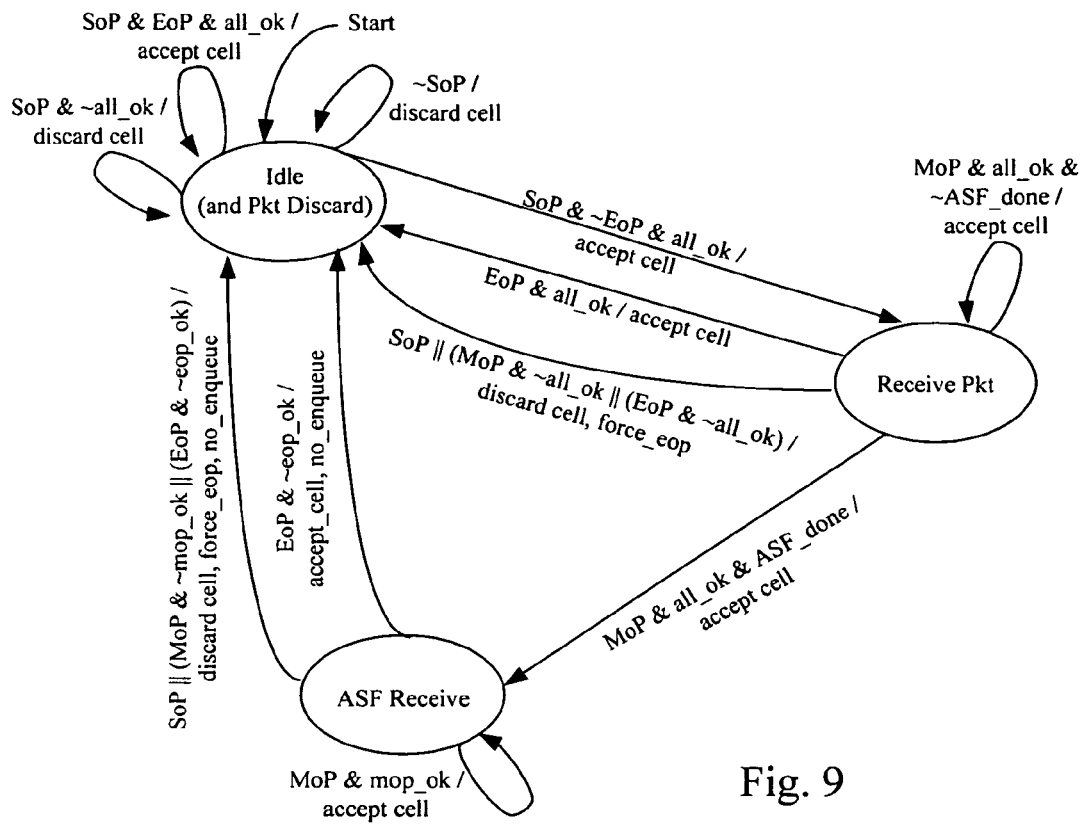
FIG. 9 illustrates an input port admission state machine according to an exemplary configuration of the present invention.

FIG. 9 shows the state machine which makes the final accept/discard decision based on the above inputs. There are additional outputs from this decision: Accept/discard the incoming cell or Force_eop. In the latter, the logic can force the END bit in the cell header memory to be set on a non-EoP cell to truncate a packet when it decides the packet needs to be discarded after already receiving part of it. This indication will only be set when the current cell is discarded (adm_accept=0); this means that the previous cell of the packet which was accepted in a previous RX data flow is to be remarked with END and PURGE set in the cellHDR memory. For ASF_ok, the output to queue thresholds indicates that the current cell is all_ok, and in the middle of packet reception. For ASF_receive (or no_enqueue), the output to queue thresholds indicates enqueuing should not occur as usual with the EoP or force_eop since the packet was previously enqueued for ASF. This is also used for MoP received cells to do queue accounting. For adm_idle, this is sent to Input port thresholds to validate a new SoP. For adm_COS and adm_CPU_COS, this logic captures the COS and CPU_COS on the PBI with a valid SoP. These values are sent with each accepted cell to the output queue threshold logic and the enqueue block of the queuing logic, where pbi.COS and pbi.CPU_COS are only valid on SoP cells, not MoP or EoP. The EoP or force_eop condition usually causes the enqueue action to occur. Enqueue can also occur for ASF as determined by the output queue thresholds block. This state machine catches errors in protocol (such as SoP after SoP without EoP). A good packet may be sacrificed in this case to create a forced EOP from the new SoP cell to complete the previous bad packet. If a packet is purged for some reason in the middle (at an MoP), then the MoP cell is discarded, and the previous cell is forced to be an EoP for queueing and the rest of the packet's cells are discarded in the IDLE/PKT_DISCARD state where it waits for a new SoP cell. If any discard input (pbi.purge, ip_discard, op_discard or buffer_full) is asserted, then the cell is discarded, and will not occupy a cell in the CBP.

A packet can be purged for several reasons. These include when the IP says purge, where the pbi.purge bit is set (usually due to CRC error detected in MAC). This also includes L2 MTU failure, where a port that appears in the SoP output bitmaps from the IP will be set in pbi.port_purge_bm to block the packet on specific output ports. L3 MTU failure, where this is taken care of by the IP on the SOP cell and the port_bitmap is adjusted. The MMU does not need to take any further action. When either the output queue or port threshold may be exceeded, the input port threshold is exceeded or there is a buffer full condition. The output queue threshold being exceeded and an L2 MTU failure will only cause a purge to the affected queue, while the others will cause a multicast packet to be purged from all output queues. When a packet is purged or discarded on the SoP cell to all outputs, then the entire packet will be discarded and never stored into the data buffer. When the purge occurs after the SoP, but before it is enqueued, then the packet is linked to the purge queue of an output port instead of the regular CoS queue. The purge queue is a means to return cells to the free pool and update admission counters for partially received packets as soon as possible without wasting output port bandwidth. The purge queue is described more fully below.

If the purge condition occurs after the packet has been enqueued, then the purged packet will be transmitted to the EP, but the cells in the middle or end of packet will set the PBE.purge indication by first either setting the cellHDR.purge bit (to purge all output ports) or by setting the correct bits in the port_purge_bm field of the pktHDR0 memory (to purge only selected output ports). If the pbi.Purge_cell bit is set with the SoP cell, then the MMU will discard the entire packet. If the pbi.Purge_cell is not set in the SoP, but is set in a later cell, either a MoP or EoP, this is considered a late purge.

For the late purge condition, the MMU has already committed to storing the packet in the buffer and the destination queues. However, the MMU does not need to store any cells that arrive after the pbi.Purge_cell is first seen. The MMU can discard all cells in the tail of the purged packet. When not in cut-through (ASF), and the late purge occurs, the MMU still stores and queues the (partial) packet on all output port's purge queue(s). The EP will not see any part of a purged packet. When ASF is enabled, and a late purge occurs, then the packet may have already been queued to the regular CoS queue. The packet information has also already been written into the packet header and transmission to EP may have already started. In this case, the late pbi.Purge_cell causes the purge bit in the Cell Header table to be set so that it may propagate with the same cell to the EP when it is scheduled for transmission.

Since the admission control logic makes the packet enqueue decision in addition to the cell accept decision, it needs to make the decision when to do the ASF (or cut-through) early packet enqueue. The admission block has all the output queue lengths which are needed to make this decision. The decision of when to link a packet to the end of each output queue is determined by the mode, ASF mode or store-and-forward mode. The ASF mode tries to link the packet for each cell arrival after the first the first cell, but store-and-forward mode always waits until the last cell, EoP, arrives in the MMU. ASF mode needs to be enabled for the MMU as well as other conditions being met to actually enqueue a packet with a MoP cell. When in cut-through mode, the latency of waiting for a large packet to completely arrive can be masked if the queue depth is small. However, using store-and-forward mode has other advantages. These include that all MTU checks are complete before enqueuing the packet, that the Ethernet CRC check is complete before enqueuing the packet and that all threshold checks (for all cells of packet) are compete before enqueuing the packet.

The flow control mechanism for the MMU contains counters and thresholds that are purely input-port based. The flow control mechanism can generate per-priority (CoS) flow control or port-based pause flow control directed to any of the input ports. And in some circumstances, it can also cause input cells and packets be discarded. The flow control generated is called link level flow control (LLFC) because it only affects the data flow between two connected chips on a single link. This type of flow control is also referred to as SAFC, Service Aware Flow Control.

Some features of Link Level Flow Control are to provide an option for loss-less operation for either any port configuration, to allow high priority traffic to proceed while blocking low priority traffic in times of congestion, to assert flow control as infrequently as possible to maximize the bandwidth of the switch. Other goals of the flow control mechanism are to allow low-priority classes to be oversubscribed to allow for more buffer sharing and less frequent flow control, to be as non-blocking and non-starving as possible of lower class traffic by higher classes and to provide minimum guarantees to avoid starvation of lower classes and to also allow a minimum bandwidth for each port.

The basic LLFC message will be xon/xoff on a per-class (or per priority) level. Port-level pause can be considered as the same as class-based flow control applied to all classes. This section describes the general concept of how the flow control is used. Pre-emptive flow control messages reduce the amount of headroom that is necessary to be reserved for each input port because it is possible to get the flow control message out sooner where it could have possibly have been stuck waiting for an entire jumbo packet. LLFC is based on counters of buffer usage by each input port. When a counter crosses its threshold, flow control (xoff) is asserted to the source port. When flow control is asserted, there must still be room in the buffer to allow for packets already in flight to be received (to remain loss-less). Without pre-emptive messaging, the worst case scenario for buffer usage related to flow control occurs when a threshold is crossed and the port should assert flow control, but a jumbo packet was just scheduled (in the opposite direction of the flow to be stopped) and makes the flow control message wait for the jumbo packet time; during this time data continues to arrive.

With or without pre-emption, when the flow control message arrives at the data transmitter, it may have just started sending a jumbo packet and will complete it. Without pre-emption, this leads to a worst-case scenario of three jumbo packets plus the round trip time (RTT) of data that needs to be stored whenever flow control is asserted. With the 128-byte cell size, if 64-byte packets are received which use up 128-byte cells, then approximately two jumbo packets worth of buffering can be received while waiting for a single jumbo to be transmitted out. Then another jumbo packet can be received just before the flow control takes effect at the transmitting end. With pre-emption, the headroom buffer requirement is reduced to a single jumbo packet size plus the RTT since the message does not need to wait to be transmitted. The jumbo packet size still dominates this calculation (the RTT is very short relative to a jumbo packet). In order to assure loss-less operation, a jumbo packet worth of cells (72) should be reserved for each flow that can be stopped (if it's purely per-class flow control, than that's a jumbo per class per input port). In the worst case, this means that 1400 KB (8 COS*(1 jumbo packet (9 k bytes))*20 ports) would need to be reserved at each crosspoint buffer. By limiting the reserved amount to a per-port basis, the amount needed for reserve is only 180 kB (20 ports*(9 k) jumbos) out of the 2048 kB data buffer. With two classes (or priority groups), the headroom requirement is approximately 360 KB.

Since completely loss-less operation can be very blocking and the buffer size may be relatively small, a mechanism to maximize the use of the buffer at the possible expense of completely loss-less, non-blocking operation can be used. Therefore, the network device may be described as loss-less to a point, with that point being determined by an N-to-1 ports oversubscription and multiple (M) of these N-to-1 are occurring at the same time. Also, since the packet size plays a part in determining the reserve space needed after flow control is asserted, the switch will be more lossless or more non-blocking with a maximum packet size of less than 9 k bytes.

To allow all the guarantees to make sense with the limited on-chip buffer memory, the eight input priorities per port can be grouped such that some of the guarantees and thresholds will be applied to a group consisting of one or more CoS priorities. The network device, according to one embodiment, implements three separate priority-groups (PG) per input port. Each of the eight individual priorities (aka CoS) levels will be flexibly mapped to one of the three groups. The priority group characteristics include each input port supports 3 priority groups (PG0, PG1, PG2), each input priority value (0-13) will map to one of the three priority groups and the priority groups have an implied priority (PG2>PG1>PG0). Each priority group can be configured as guaranteed delivery (GD) which is lossless or best throughput (BT), which is not lossless, and each priority group can be programmed with a guaranteed minimum buffer space. Each priority group can also be programmed with a guaranteed headroom buffer space. Each GD (lossless) priority group should have a guaranteed reserved headroom equal to the worst-case RTT. Each priority group can have access to a global headroom to complete one packet after crossing the discard threshold. This is primarily useful when no per-PG headroom is allocated, e.g. BT traffic. Each priority group has a xoff/xon thresholds for flow control which affects all individual priorities assigned to the group.

Figure 10:
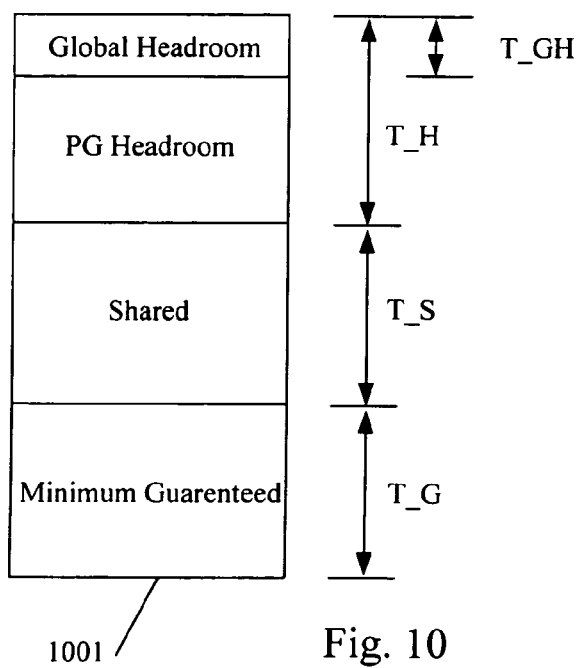
FIG. 10 illustrates a data buffer space in an exemplary embodiment of the present invention.

The buffer can be viewed as three separate blocks of cells 1001, as illustrated in FIG. 10. A first block is minimum guaranteed space, where this section allows for a minimum guarantee on a per priority group, as well as per-port, basis. The shared space is the buffer space that is left over after all the headroom and minimum guarantees are subtracted from the total buffer. This space should be dynamically shared by the ports and priorities to make maximum use of this limited space. An option for static thresholds is also available. The headroom space allows for accepting some data after the group's shared threshold is reached. There are two kinds of headroom, including PG and global headroom. PG headroom is designed to allow the round trip time of data to be received after a flow control message is sent out. For every lossless priority group that has a minimum guarantee, it should also have a full headroom guarantee also (just to guarantee the minimum) and to allow for lossless operation. Global headroom is mainly designed for PGs that do not have their own Per-PG Headroom. This allocation of buffer memory is shared by all PGs of all input ports that are enabled to use it. It allows only one packet to complete (to EoP) if used for each PG within each port.

Figure 11:
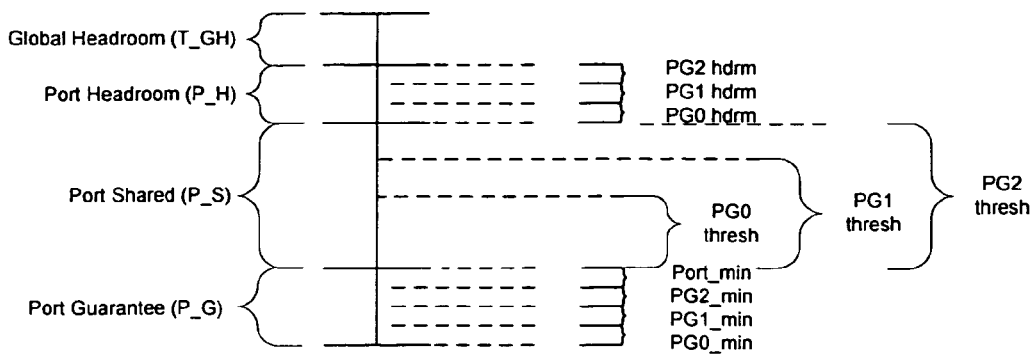
FIG. 11 illustrates the per-port buffer space allocations for PG traffic in an exemplary embodiment of the present invention.

Each port is allocated a portion of the data buffer space in each segment: headroom, shared, and minimum guaranteed. The port (and per-PG) guaranteed minimums and headrooms are programmed as static values (in numbers of cells). The per-port allocation of the shared space can be programmed as a static value or computed as a dynamic threshold. The per-port shared threshold is also used as PG2's shared threshold (only the highest PG can use up all of the shared space). The shared space thresholds for PG1 and PG0 are then computed as a fraction of the PG2 threshold. This is done so that higher priority traffic can always get through in times of congestion. The per-port buffer space allocation and the PG thresholds are shown below in FIG. 11.

When new cells arrive from the IP, the order of buffer space usage is as follows:
1. PGx_min space
2. Port_min space
3. Port shared space
4. PGx_hdrm space
5. Global Headroom As cells are transmitted to the egress pipeline, they are released from the MMU's cell data buffer in the opposite order in which they were received. For example, when a cell is transmitted that arrived on an input Port (p), with PG (pg), and that PG has used global headroom, then that global headroom usage is released first. If there is no global headroom used by Port(p)/PG(pg), and if it's own PG_headroom has been used, then one of those cells is considered released, and so on, for the port shared space, then port min space, and finally PG_min space.

Each port has a guaranteed minimum number of cells allocated to it. This is not usable by any other input port. The main purpose of the port minimum is to allow well-behaved data flows from under utilized input ports to under utilized output ports to always be able to get through. This guaranteed space is available to any class of service on a first come first served basis. The port minimum should be on the order of 100-200 cells.

In addition to the port minimum, there is the ability to give each priority group (PG) a guaranteed minimum to assure non-blocking performance between the different PGs. A lossless (GD) PG would only require a few cells to be set aside since it would also have a full headroom of guaranteed space to at least guarantee one maximum sized packet to get through. A lossy (BT) PG would need a minimum guarantee of at least a jumbo packet size because it has zero headroom allocated. However, using the global headroom space for these BT PGs can also alleviate this heavy requirement of one full packet size per BT-PG per input port. Allocating less than the full space needed by all BT-PG should statistically be able to satisfy a much smaller minimum guarantee for the BT PGs by sharing the global overhead space. It would not be an absolute guaranteed all the time, but can come close statistically.

The group thresholds of the port shared buffer space are set up to assert flow control on the lower priority traffic before the higher priority traffic as the port usage increases. This can lead to starvation of the lower priorities by higher priority traffic (at least within the shared space), but the PG minimum will provide starvation protection. Therefore, the XOFF flow control to any PG is not sent until both its minimum has been used, and the shared space reaches the PG threshold.

The port shared space amount, or PG2_threshold, can be computed dynamically based on the remaining total shared space available in the buffer or this threshold can be set statically at configuration time. The same algorithm that is used for dynamic sharing of the buffer space between the output queues is used here on a per-input port basis. If a static threshold is set, then the overall accounting will be done such that the buffer can be over-subscribed, i.e. the sum of the static thresholds can be larger than the total shared available, T_S. But in addition, the guaranteed space for minimums and headrooms, won't be compromised. This means that for a shared cell to be used, in addition to the port and PG thresholding checks, the total number of shared cells, T_S, cannot be exceeded.

When a PG's shared space threshold is reached, it causes an XOFF flow control message to be asserted on all the priorities that belong to that group (assuming that the PG's min_guarantee is also completely used). At this point, the PG is not allowed to use any more shared buffer space. If the group is loss-less, GD, the overflow cell arrivals will use the PG's headroom. After the PG threshold is reached for BT traffic (with no per-PG headroom available), global headroom can be used to complete one packet and then newly arriving cells are dropped.

XOFF and XON (pre-emptive) message generation is enabled on a per-port and per-priority basis. Because the shared threshold can be dynamically computed, the XON threshold, or reset_value, is usually computed as a percentage of the XOFF value at the time it was crossed. When the port's shared cell usage drops below the PG's reset_value, an XON message is sent for the priorities belonging to the PG and it is again allowed to accept cells into the shared space (given a new XOFF threshold calculation for arriving cells).

Figure 12:
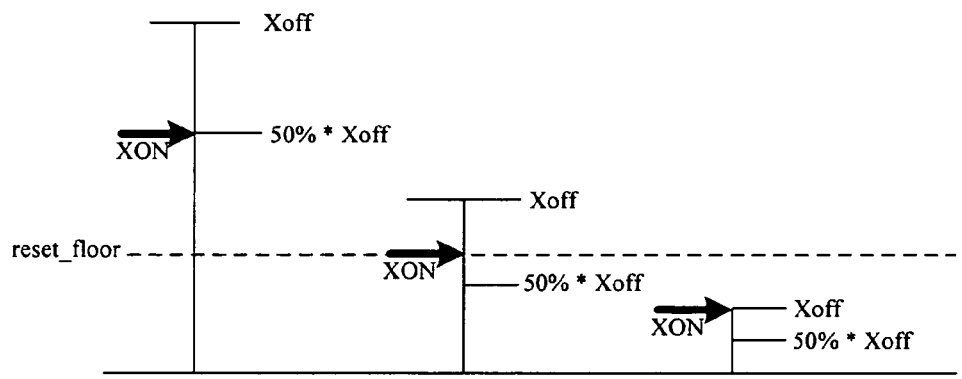
FIG. 12 illustrates a process of computing the XON reset value according to an exemplary configuration of the present invention.

To try to maximize bandwidth usage in a system using the network device of the present invention, the XON reset_value should not be allowed to become too small. If the reset_value is too small, then the buffered cells will drain before new cells can arrive from the link partner, and bandwidth will be lost. To guard against this, a programmed reset_floor can be set that will be used as the XON level when the amount of shared space becomes very small. Three examples are shown in the FIG. 12 of how the XON is set for three different values of XOFF, and a reset select value programmed to be 50%. In the actual implementation, the reset_value below the reset_floor is not necessary because the reset_value is only checked when cells depart, and setting reset_value=xoff is the same as setting reset_value>xoff (the next departing cell will cause XON to be generated). It should be noted that the PGx_threshold is only checked and an XOFF message can only be generated when a new cell arrives on that port. All three PG thresholds are checked for that input port. The reset_value is only checked and XON can only be generated when a cell departs for a cell that arrived on that input port. All three PG are checked for XON, i.e. not just the PG of the current cell being released.

Each PG of each port may have a headroom allocated to it to absorb the RTT packets in flight. This is mainly used for GD traffic types. In addition to the per-PG headroom, a single shared global headroom is available to be shared by all the BT (nonlossless) class groups to try to minimize unfair packet loss due to large packet sizes (because large packets are more likely to cross the group threshold and be more likely to be dropped than small packets). Having some headroom available for packet completion mitigates this effect.

The global headroom is only available to complete a single packet that has been partially received before running out of other buffer resources. Also, the global headroom is only used if it can accommodate the remaining portion of the partially-received packet. This is accomplished by assuming a maximum-sized packet is in progress, and the necessary space is reserved from the global headroom if it is available. If the number of data cells is available in the global headroom, then it will be used for any newly arriving cells up to the last cell of the packet, and any remaining cells reserved from the global headroom (if the packet is not an MTU packet), are immediately given back to the global headroom pool. The global headroom pool is not used for a SoP cell to start receiving a new packet.

The buffer usage description up to this point has been made for all regular Priority/CoS traffic (Priority 0 to 7); however, the buffer usage is slightly different for the SC and QM traffic. The SC and QM priorities do not belong to any of the three priority groups. These priorities do not participate in any of the per-port allocated space or headrooms except that they each have their own guaranteed minimum. These priorities also cannot be flow controlled. Therefore, the cell usage for these priorities is as follows: port_SC_min or port_QM_min and shared space up to the whole shared available (T_S, not P_). Since these priorities go into output CoS queues that are scheduled for transmission with highest strict priority, the buffer usage for this traffic should stay small. If this traffic class is going to a slow port, such as the CPU, care needs to be taken, so that a large portion of the shared space is not eaten up by this traffic. This can be accomplished by setting small static drop thresholds on the queues of the slow output ports. A paused port can also be considered a slow port, but on a HiGig port, the SC and QM queues cannot be backpressured. These queues also do not exist for ethernet ports, and the CPU port should not receive QM traffic under normal operating conditions.

When the input port threshold logic decides that it cannot accept a cell, it is because there is no space left for this input port and priority group. The final admission decision, however, can still accept a cell to complete the packet and get an END cell into the queuing structure. A small number of cells can be held back to take care of this case (for example, the buffer full condition is asserted a few cells before the buffer is really full). These cells that have no place to go will be accounted for as shared cells against the port and the global shared pool. This way the shared cells will be used until they are gone (preserving all the other guarantees). Under extreme circumstances, a cell may be accepted when the total_shared_available is already zero.

Admission thresholds are applied to every cell as it arrives in the MMU for a particular output queue. The thresholds are based on port and queue cell counters. A packet will pass both the queue threshold and port threshold checks to be admitted to the output queue. The per-queue thresholds can be configured to be dynamic (based on the amount of buffer space still available) or static (a pre-programmed number of cells). The per-port threshold is only a static number of cells across all queues associated with that port.

When a queue (or port) crosses the discard threshold and the threshold check is enabled, a configured policy determines if the last packet that crosses the boundary should be enqueued or purged. In addition, the queue (or port) enters a drop state. When in the drop state, no new packets can be accepted for the queue until the queue has drained below the reset value (in cells).

When the first cell of a packet arrives and all output ports/queues are in the drop state, then the packet will be discarded (not stored in the buffer). If at least one output port and queue is not in the drop state, then the packet will be stored in the buffer to be possibly enqueued for the ports not in the drop state. The individual queue thresholds themselves are checked for each cell arrival and at the time of enqueuing the packet (EoP cell or cut-through time). It should be noted that there is no need for thresholds based on the number of packets. Since the number of packet pointers for each port equals the number of cells in the buffer, it is impossible to run out of packet pointer entries.

The threshold to check the queue length can computed dynamically or programmed to a static value. Parameters that affect the threshold value are programmable (to allow differentiation between ports and classes of service queues). The beneficial properties of this thresholding scheme include that the discard thresholds are high when total buffer usage is low, allowing a single queue to use more buffer space when it is available and all active queues at all ports get some buffers and some bandwidth (no starvation). Implementing cut-though scheduling for large packets helps ensure this scheme remains well-behaved. Therefore, the network device can implement the cut-through mode, also called ASF alternative store-and-forward.

The present invention can also implement the dynamic queue thresholds with a queue cell counter for each queue of each output port and class c ($Q(i,c)$), and a separate counter for the total number of cells available (Bavail). For an incoming cell to output port and class c, the cell will be admitted if: $Q(i,c) < \alpha(i,c) * Bavail$ and $Bavail = B - Qshared - R$, where B=total buffer, R=reserved amount of buffer (to satisfy queue minimums) and Qshared=the number of used shared cells (the total cells used above the reserved minimums).

The alpha value, $\alpha(i,c)$, is programmable for each queue in powers of 2 (making the threshold calculation a simple shift left or right of the number of cells left in the buffer). When the cell discard threshold is crossed and the queue minimum is also met, the queue shall enter a drop state until the level falls below a reset value that provides some hysteresis. This will ensure that wild on/off fluctuations do not occur rapidly which would prevent a whole packet from being admitted over a long period of time, and it also ensures that no one input port will be starved due to the input traffic patterns.

As an alternative to the dynamic threshold, each queue can be programmed to use a static threshold instead of the dynamic threshold. Although the dynamic threshold is expected to behave better than static thresholds, this is implemented as insurance in case the dynamic thresholds do not behave nicely under some traffic conditions or to set a hard (and preferably small) limit on some queues. The static threshold check is easier to apply to the queue cell counter than the dynamic threshold. The static threshold is configured in a software-written register (with the value in cells). When the queue cell count goes over this value, newly arriving cells are dropped and the queue enters drop state.

Even though the dynamic threshold mechanism is designed to leave some buffer space always available, the network device will support a per-queue minimum (in cells) that is a static programmed value. The minimum values can be guaranteed to be available by using the 'R' value discussed above, that is the sum of all the minimum values. This will ensure that the minimum cell guarantees will be available whenever needed.

The threshold logic maintains a counter of cells in use by each queue. A programmed queue minimum value is also needed for each queue. As long as the queue's counter is below the programmed minimum, cells will be accepted by the queue and will not count against the total shared cells used (Bavail). For multicast cells which can be queued to multiple queues (some of which may be above the their minimum while others are still below their minimums), the following rules would ideally apply to accounting of shared cells:

1. When a multicast cell arrives, it will be counted against the shared Bavail if at least one queue is over it's minimum;

2. When a multicast cell departs, the Bavail will be incremented if at least one of the queues that transmitted it was above it's minimum when the cell was transmitted. However, Rule #2, above is very hard to implement without a large cost in memory space. Also, as partial packets are arriving from different input ports, each output queue should account for the queue minimum guarantee on a cell-by-cell basis to make sure that the sum of those cells received from the separate input ports does not exceed the queues minimum guarantee. Therefore, each cell will be marked as a min cell or a shared cell based on a set of rules for the current state of all the port output queues for this packets.

In addition to per-queue maximum thresholds, a per-output-port maximum threshold can also be programmed. This is especially useful when the per-queue thresholds are set to static mode. The per-port threshold can allow the per-queue thresholds to be oversubscribed such that the sum of the queue thresholds is greater than the port threshold, but the sum of the queues are never allowed to exceed the port threshold. This port maximum is only enforced on the shared cells; cells that go to the queue minimum guarantees are not counted against the port maximum.

As described above, the toughest port of the output accounting is handling the case for a multicast cell with some outputs still under their minimum guarantee and some over their guarantee but still under their shared threshold. If the cell is counted as a min guaranteed cell, then when a queue that is under it's minimum transmits the cell, but other queues have not yet transmitted it, this well-behaved queue should be allowed to accept another cell under its minimum even though a real cell has not been freed from the cell buffer.

If the accounting of Bavail is not tied to specific cells, then a cell can be considered a minimum guaranteed cell when it arrives, and more cells may be queued past the queue's minimum, then when that cells departs it can decrement the Bavail value (as a shared cell). The following approach has been chosen to account for guaranteed min cells completely separately from the shared cells in each queue. Output queues still count virtual cells in that each output queue increments it's own counters for each multicast cell. However, the total_virtual_cells count does not need to be tracked and it is not necessary to create and destroy virtual cells as multicast packets (and cells) arrive and depart.

To simplify the queue cell accounting, each queue keeps two separate counters that are updated as each cell arrives or departs. The queue_min_count and the queue_shared_count count the number of minimum guaranteed cells and shared cells, respectively. The cells in the buffer are separated into two pools: Minimum Guaranteed Cells and Shared Cells. By accounting for the usage of guaranteed cells and shared cells separately, the shared cell usage will never encroach on the guaranteed reserved cell pool. When a cell arrives, it will be marked by setting a bit the Cell Header memory with an indication if it is a min cell or shared cell for output queue accounting.

When a new cell arrives, the output port threshold logic will do three things: Decide if the cell should be accepted or discarded by checking the thresholds; If accepted, then decide if it is a min cell or a shared cell. It should be counted the same for all outputs. At enqueue time, decide if the packet should be enqueued to the regular CoS queue to be transmitted to the port, or put on the port's purge queue so it is not transmitted, and the cells are returned to the CFAP as quickly as possible.

Some guidelines to be followed for the best behavior of the system are discussed below. When cells arrive, they will use the output queues min guarantee first, to leave the most cells available in the shared pool for the best use of the total buffer. Queues should not use up as much shared space as they can get before using it's guaranteed pool. When the shared pool is completely used up, all queues can only use their minimum guaranteed cells. A queue should never be allowed to use more min cells than it's minimum guarantee value. A queue may temporarily use more shared cells that it is entitled to (i.e. go over the shared threshold) under certain conditions in the middle of packet reception and only when configured to do so. The total number of shared cells used in the system should never exceed the programmed number of shared cells available so that the guaranteed cells are always available when needed.

With the above guidelines in mind, the rules for marking a newly arrived cell as a shared or min. cell (for multicast as well as unicast cells) can be described as: If all output queues are not using all of their entire minimum allotment, then count the cell as a min cell. If any output queue is already using its total min guaranteed, and other output queues' shared usage is under its own shared threshold, then the cell is counted as a shared cell. If all queues are over their min limit and over their shared limit, then drop the incoming cell (if SoP) and the remaining cells of the packet. Other rules apply to non-SOP cells.

When a queue's cell count crosses the discard threshold, whether dynamic or static, the reset value for the queue is based on that value. This is used for the dynamic thresholds since the threshold itself changes for each arriving cell. Because the queue has two counters, one for min cells and one for shared cells, each queue is not considered in HoL drop state until both the q_min_count has reached the guaranteed minimum for that queue and the q_shared_count is over the queue's shared cell threshold, either static or dynamic. When the queue enters drop state, the hysteresis will be calculated based on the total number of cells in the queue (both min and shared), so that when enough cells are transmitted, no matter the type at the head of queue, the drop state can be reset.

Figure 13:
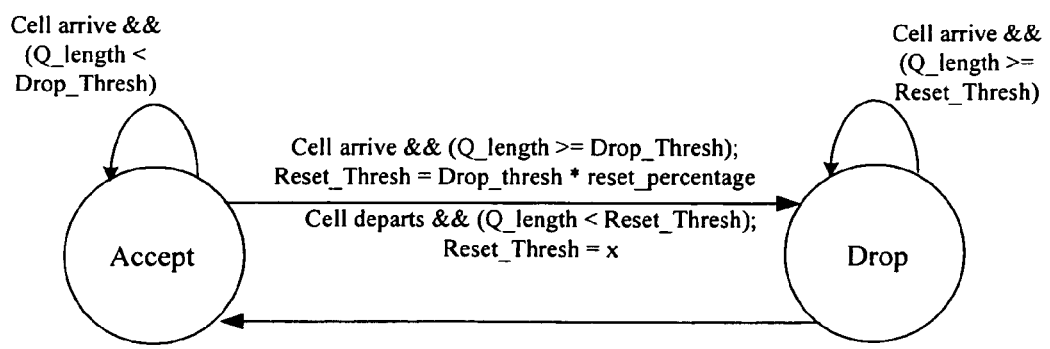
FIG. 13 illustrates a cell drop hysteresis state machine in an exemplary embodiment of the present invention.

Each port will also keep a drop state and reset hysteresis when the port_shared_count crosses it's threshold, independent of any individual queue within the port. The state machine for this process is illustrated in FIG. 13. The HoL drop state for each queue and port is maintained in the MMU and transmitted to the IP-Isw2 stage and also transmitted as E2ECC information to other modules in the system. Packet discards due to HoL drop state are enforced by the Isw2 logic and not the MMU logic. However, the MMU does do individual min_count and shared_count based discards.

The threshold logic determines if a packet should be enqueued for ASF, cut-through mode, based on queue cell counters as well as other criteria as described above. The ADM state machine makes a packet ASF_ok, if it is the second or later cell of a packet. The rest of the checks performed by the output threshold logic are as follows: ASF is enabled; the input port is as fast or faster than all output ports; all output port queues are of a very small length (close to zero), ADM is in receive packet state and this is not an EoP or force_eop cell and the number of cells received so far for the packet is greater than a configured number (set in the range of 3 to 5).

Figure 14:
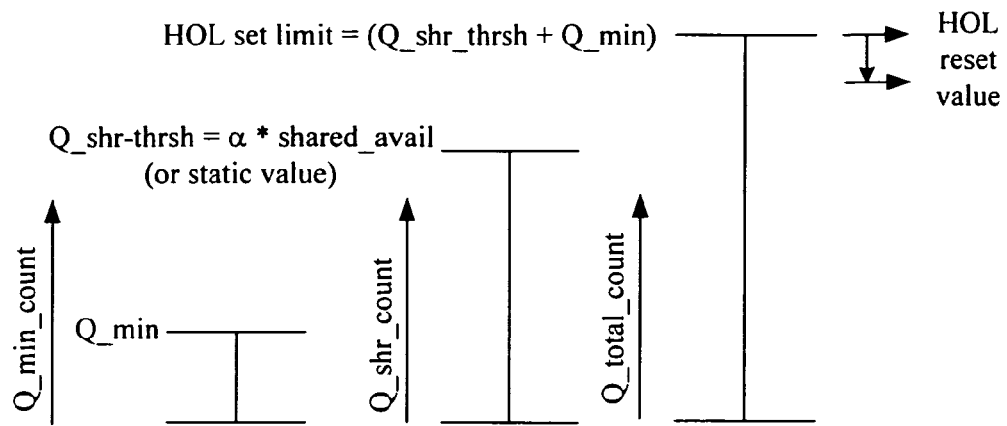
FIG. 14 illustrates the use of per-queue counters and head-of-line set or reset in an exemplary embodiment of the present invention.

The output port threshold block should also decide when to set (and reset) the per-queue HOL discard state that is sent to the IP's Isw2 stage. This status is also sent in E2ECC packet to other modules in the system. When a queue's (q_shared_count>=q_shared_threshold) and (q_min_count>=q_min), then set the queue's HoL drop state. Also set the q_reset_value to a percentage of the (q_min+q_shared_threshold). When the Queue's (q_min_count+q_shared_count) falls below the q_reset_value, then reset the queue's HoL drop state. When the port's (port_shared_count>=port_max_threshold), then set the port's hol drop state. This is OR'ed with all the queue hol drop states for the port, when sending to the IP. When a port's count drops below the port_reset_value, then reset the port's hol drop state. These statuses are further illustrated in FIG. 14.

The output port threshold logic has four distinct sub-sections: cell arrival, cell accept, enqueue and cell transmit.

When a new cell arrives, it is first decided if the cell should be accepted for output thresholds (and send this result to ADM block). Also, the cell is classified as a min or shared cell. If a min cell, then increment all output queue min counters. (decrement later if cell is not accepted); by incrementing immediately, the min counters may still exceed the q_min value by a count of three (3). If a shared cell, then increment the total buffer_shared_count (and decrement later if cell is not accepted). By incrementing immediately, this counter may still exceed the programmed maximum by a value of three (3). These two possible overshoots should be considered when configuring the op_buffer_shared_limit. When ADM block says to accept cell (or not), then update all the queue and port counters, and HOL drop states. Also, decide if cut-through can be done for this packet at this time. When it is time to enqueue the packet (due to EoP, force_eop, or ASF cut-through), then it decides whether each output port should enqueue for regular CoS queue or enqueue for purge queue. When a cell is transmitted (and released) from the output queue, all the queue and port counters need to be updated, and possibly reset the queue and port HoL drop states.

The MMU Queuing Block links cells together into packets and also links the packets together to form each output queue. It deals with most of the control information from the IP on the PBI and also generates all the control fields for each packet and cell when sending data to the EP. When packets/cells are scheduled for transmission, the Queuing block retrieves the cell pointer and updates all the queuing structures. It determines if packet replications (multiple copies on a single port) are necessary for the packet, and also determines when each cell can be returned to the free cell pool for re-use after all ports that need the cell have transmitted it.

Figure 15:
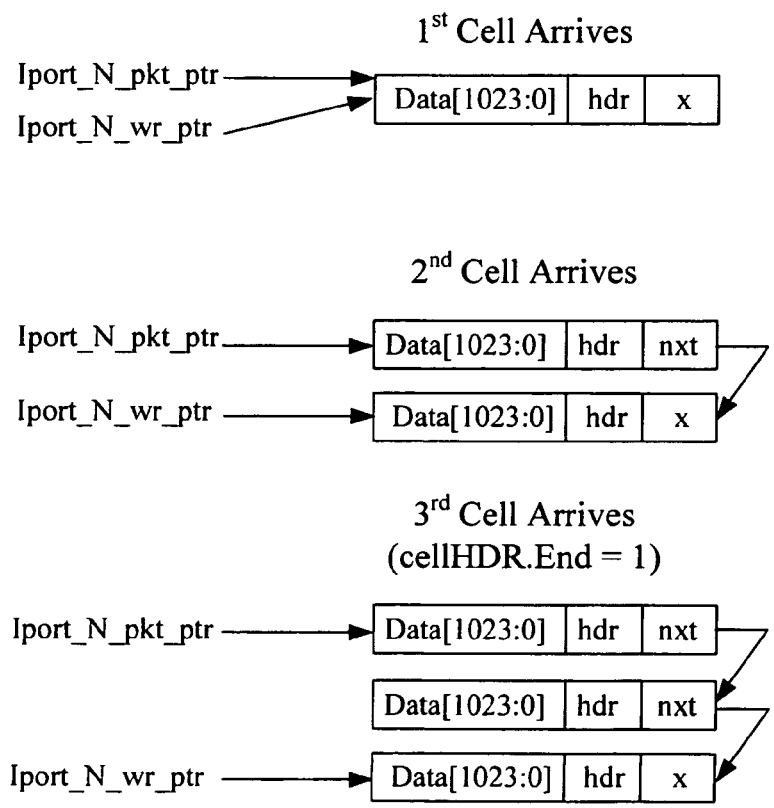
FIG. 15 illustrates the process of packet re-assembly at an input port according to an exemplary configuration of the present invention.

Since data cells arrive from the IP interleaved from each input port, the first step in the queuing block (after the admission block determines it is ok to receive the cell) is to link the cells from each input port together into a chain to form a packet. FIG. 15 shows what a re-assembly queue looks like as each cell of a three-cell packet arrives. When a new cell arrives, the new_cell_adrs comes from the buffer block, and the pbe.Src_port_num indicates which input port (iport) the cell came from. The admission block makes the cell accept decision and passes this to the queueing block to be linked into the current packet being received from this input port. The re-assembly pointers as well as the cellHDR and cellLink memories are updated.

Figure 16:
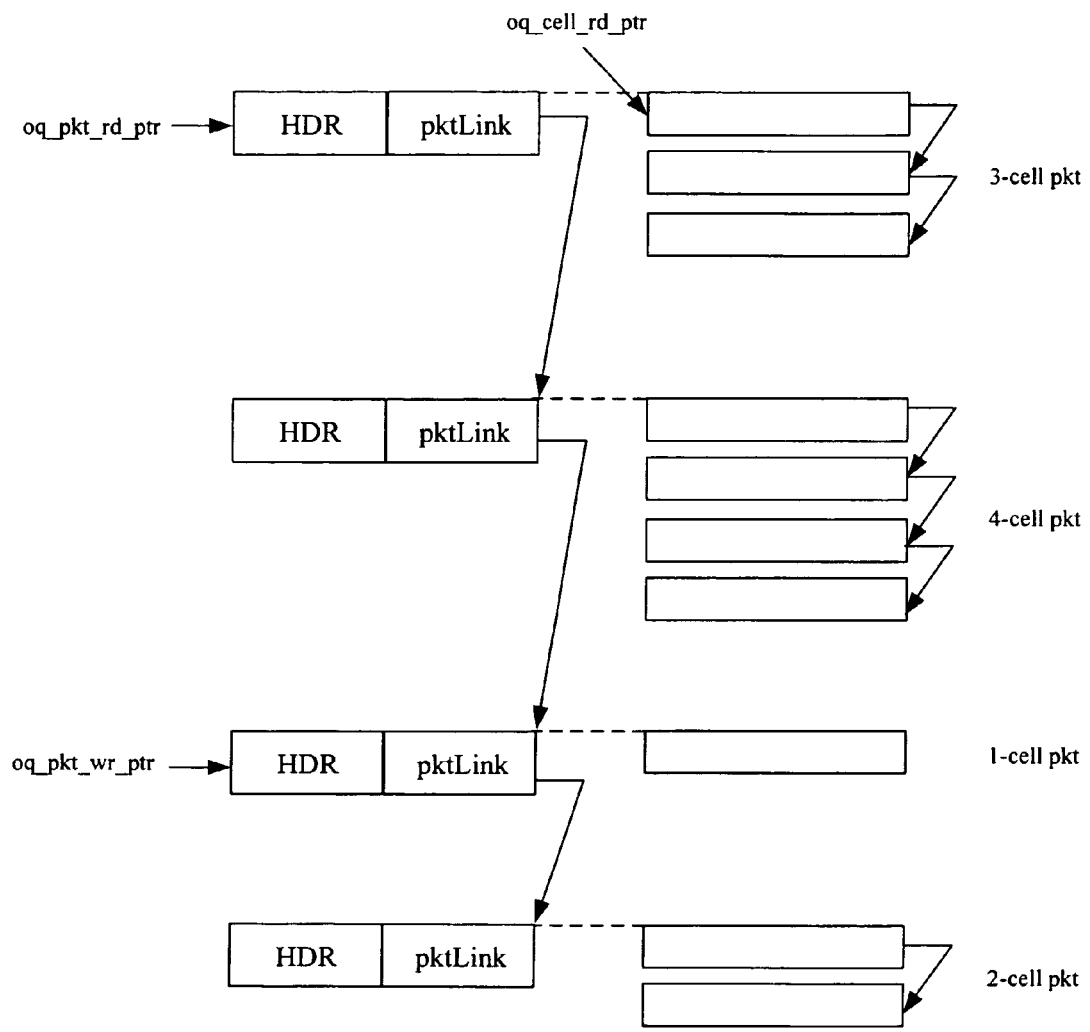
FIG. 16 illustrates the queue structure in an exemplary embodiment of the present invention.

Enqueuing a packet links it to the output queue(s) and makes it eligible to be scheduled and transmitted cell-by-cell to the EP. Packets can be enqueued when the SoP cell arrives (in ASF mode) or after the EoP cell has arrived. The actual enqueue action occurs when the admission block tells the queueing block to enqueue the packet. All of the admission decisions are completed by the admission block, including the enqueue decision. The queueing block can then just manipulate the queue pointers when needed. The general output queue structure is shown in FIG. 16.

In ASF mode, a packet can be enqueued before it has been completely received. Whenever a threshold is exceeded (or another error occurs) after the first cell has arrived and been queued, then at least a partial packet is already stored in the buffer. Even if the bad packet is caught before it starts being transmitted to the output port, if it is already enqueued, and then it must be completely scheduled by the output port to follow the packet linked-list and to return all the cells to the free list. This is especially true for multicast packets which need to be received in their entirety for any output ports not over their thresholds, but may have been queued to some outputs for which the queue exceed it's threshold in the middle of receiving the packet.

In the store-and-forward mode, the packet would only be queued to the port CoS-queues that can completely receive the packet. For the ports/queues that cross over their thresholds, the packet is linked to the port's purge queue thus saving bandwidth to an already congested output. In ASF mode, this is not possible since the packet is already enqueued.

When a new packet is complete (the End cell has arrived), then the packet is linked to one or more output queues if it was not already linked due to cut-through mode. Note that even when cut-thru mode is enabled, some packets can become store-and-forward if the output ports are oversubscribed.

The Cell Copy Count (CCP) keeps track of the number of ports that need to transmit a cell before it can be returned to the free cell buffer pool. Since modifying the CCP count is a read-modify-write operation that should occur in the output pipeline, there is no free cycle to write the initial value when a cell arrives (in the input pipeline). Therefore, a second value, the port_count, is determined when a cell/packet arrives and is written by the input pipeline and only read by the output pipeline. The port_count value is not actually stored, but can be derived value from the port-bitmaps in the pktHDR1. The CCP memory is initialized to all zeros for all cells. So when the first port transmits a cell, it reads '0' from the CCP, but writes (port_count-1). When the last port reads the CCP, it will read '1', writes '0', and returns the cell to the free pool.

If a cell is discarded or a purge is set on the pbi in the middle of a packet reception and the packet has not yet been linked to the output queue, then the packet will be linked instead to a purge queue. This is a way to keep the output queues clean so when they are scheduled, a valid packet will be transmitted with no loss in output port bandwidth. If a discard is indicated for one or more ports of a multicast packet, but there are still other ports which can receive the cell, then the cell is accepted, but the ports which are over their threshold will queue the packet to the port's purge queue instead of the regular CoS queue.

When a packet is enqueued to an empty queue, then certain portions of the pktHDR should also be written to the queue data structure (Top-of-queue). A special queue is maintained per port that is used to queue packets that are already accepted into the buffer but which received a purge or other indication that prevented them from being linked to the real CoS queues. The purge queue should be scheduled as holes appear in the scheduling for any port. This allows the cells to be returned to the CFAP and to update the admission counters as soon as possible and without creating dead space on the output port for purged packets. The purge queue has the same exact structure as the other CoS queues of a port, using the pktLink memory for the port and the cellLink to link cells within packets.

When a cell is discarded by the admission control block, a second signal force_eop can also be asserted to terminate a packet before the actual END cell arrives. The queueing structure should have the END bit set for the last cell linked into a packet. When force_eop is asserted, the cellHDR.END bit and cellHDR.purge bit are both forced set on in the previous cell tht arrived for the same input port. This means that the iport_N_wr_ptr will be used as the address to the CellHDR memory to write the cell header of the previous cell instead of writing the normal cell header using the new_cell_adrs.

To allow the admission control to remove only some of the outputs or a multicast packet, for instance when only some of them are over their admission thresholds, the queuing block will receive a port mask from the threshold block (thr_enq_port_mask). If any bits thr_enq_port_mask are '0', then those ports are removed from the port_bitmap, 13_bitmap, im_mtp and em_mtp that is stored into the packet header memory.

An output queue consists of the following basic set of pointers: Pkt_rd_ptr, Pkt_Wr_ptr, Cell_rd_ptr, and Empty_flag. In addition to the above register values, information is needed about the current top of queue packet and cell. This information is pre-read from the pktHDR1 and CellHDR memories when the previous EoP cell is scheduled. It can also be written directly into the ToQ registers when the first packet of an empty queue is en-queued.

Each queue has a Top-of-Queue (ToQ) register that has information about the queue including its packet read and write pointers, cell read pointer, and information that is pre-read about the top of queue packet and cell that will be scheduled next. The next cell and packet information is needed to respond quickly to the Scheduler block when it schedules the next cell for a queue. With 10 output ports times 10 queues, there are 100 (110 including CPU port) entries in this data structure, but it will be implemented in registers or in separate rams per port (10 entries each) to allow the Rx pipeline to write a newly arrived packet/cell into all ports simultaneously. Note that this information is read and written for every cell scheduled for transmit only once per 8 cycle window. It is also written when the queue is empty and new first_cell (packet) arrives on the pbi.

Cell de-queuing occurs when the Scheduler schedules a particular queue. When this happens the queue number (port and CoS) are sent from the scheduler to the queuing block. Several things happen in the Queuing block, including Queuing necessary packet and cell lookups, responding to scheduler (needs cell_length, EoP, and q_empty indications), updating queue pkt and cell pointers, and decrementing the cell copy_count if necessary.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed:

1. A network device for processing data, the network device comprising:
a plurality of communication ports configured to send and receive data, and wherein each communication port is associated with a plurality of class of service priority groups;
at least one ingress switch configured to:
determine a class of service priority for the incoming data, and
map the determined class of service priority to one of the plurality of class of service priority groups;
a buffer configured to store the incoming data, wherein the buffer includes, for each port, a minimum buffer allocation for the respective communications port, a minimum buffer allocation for each class of service priority group associated with the respective communications port, and a port shared portion that is shared amongst the plurality of class of service priority groups associated with the respective communications port, and wherein the buffer further includes a global headroom allocation shared among all ports for all priority groups for which use of the global headroom allocation is enabled;
wherein the network device is configured to control the flow of the incoming data through the network device based at least in part upon the mapped class of service priority group.

2. The network device according to claim 1, wherein the network device is configured to guarantee a minimum bandwidth on at least one of a priority group basis and a port basis.

3. The network device according to claim 1, wherein the buffer further includes, for each port, a class of service priority group headroom portion.

4. The network device according to claim 1, further comprising a memory management processor configured to consult a selectable discard value to determine if certain data should be discarded if processing of the certain data causes a threshold to be reached.

5. A method for processing data in a network device, the method comprising:
determining, for each port, a plurality of class of service priority groups;
mapping assignable class of service priorities to one of the plurality of class of service priority groups;
receiving incoming data;
determining a class of service priority for the incoming data based on the assignable class of service priorities;
processing the incoming data based, at least in part, upon both the determined class of service priority and the class of service priority group mapped to by the determined class of service priority;
wherein processing includes partitioning a buffer to include, for each port, a minimum buffer allocation for the respective port, a minimum buffer allocation for each class of service priority group associated with the respective port, and a port shared portion that is shared amongst the plurality of class of service priority groups associated with the respective port, and wherein the buffer further includes a global headroom allocation shared among all ports for all priority groups for which use of the global headroom allocation is enabled.

6. The method according to claim 5, wherein processing the incoming data is performed to guarantee a minimum bandwidth on at least one of a class of service priority group basis and a port basis.

7. The method according to claim 5, wherein the buffer further includes, for each port, a class of service priority group headroom portion.

8. The method according to claim 5, wherein processing the incoming data comprises storing the incoming data to a buffer portion associated with the port on which the incoming data was received such that the minimum buffer allocation for the determined class of service priority group is used first, if available.

9. The method according to claim 5, further comprising consulting a selectable discard value to determine if certain data should be discarded if processing of the certain data causes a threshold to be reached.

10. An apparatus for processing data in a network device, the apparatus comprising:
first determining means for determining class of service priority groups on a per-port basis;
mapping means for mapping assignable class of service priorities to the class of service priority groups;

receiving means for receiving incoming data; second determining means for determining a class of service priority for the incoming data based on the assignable class of service priorities;

processing means for processing the incoming data based, at least in part, upon both the determined class of service priority and the class of service priority group mapped to by the determined class of service priority; and storing means for storing the incoming data, wherein the storing means includes, for each port, a minimum allocation portion for the respective port, a minimum allocation portion for each class of service priority group associated with the respective port, and a port shared portion that is shared amongst the plurality of class of service priority groups associated with the respective port, and wherein the storing means further includes a global headroom allocation shared among all ports for all priority groups for which use of the global headroom allocation is enabled.

11. The apparatus according to claim 10, wherein the processing means further comprises means for guaranteeing a minimum bandwidth on at least one of a class of service priority group basis and a port basis.

12. The apparatus according to claim 10, wherein the storing means further includes, for each port, a class of service priority group headroom portion partitioned by class of service priority group.

13. The apparatus according to claim 10, wherein the port shared portion includes threshold levels for each class of service priority group associated with the respective port.

* * * * *

UNITED STATES PATENT AND TRADEMARK OFFICE
CERTIFICATE OF CORRECTION

Page 1 of 1

PATENT NO.       : 7,953,002 B2
APPLICATION NO.  : 11/595978
DATED            : May 31, 2011
INVENTOR(S)      : Opsasnick It is certified that error appears in the above-identified patent and that said Letters Patent is hereby corrected as shown below:

On first page, field (56), under "OTHER PUBLICATIONS", in column 2, line 3, delete "Rejecttion" and insert -- Rejection --, therefor.

In column 21, line 1-4, in claim 10, delete "receiving means for receiving incoming data; second determining means for determining a class of service priority for the incoming data based on the assignable class of service priorities;" and insert
-- receiving means for receiving incoming data;
second determining means for determining a class of service priority for the incoming data based on the assignable class of service priorities; --, therefor.

Signed and Sealed this
Thirteenth Day of September, 2011

David J. Kappos
*Director of the United States Patent and Trademark Office*